US009019928B2

(12) United States Patent
Kim et al.

(10) Patent No.: US 9,019,928 B2
(45) Date of Patent: Apr. 28, 2015

(54) METHOD AND APPARATUS FOR CONTROLLING INTER-CELL COLLISION IN WIRELESS COMMUNICATION SYSTEM

(75) Inventors: Hakseong Kim, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 25 days.

(21) Appl. No.: 14/007,140

(22) PCT Filed: Apr. 5, 2012

(86) PCT No.: PCT/KR2012/002579
§ 371 (c)(1),
(2), (4) Date: Sep. 24, 2013

(87) PCT Pub. No.: WO2012/138150
PCT Pub. Date: Oct. 11, 2012

(65) Prior Publication Data
US 2014/0016591 A1  Jan. 16, 2014

Related U.S. Application Data

(60) Provisional application No. 61/472,202, filed on Apr. 6, 2011, provisional application No. 61/472,201, filed on Apr. 6, 2011.

(51) Int. Cl.
*H04W 4/00* (2009.01)
*H04J 11/00* (2006.01)
*H04W 72/04* (2009.01)
*H04W 72/08* (2009.01)
*H04W 88/08* (2009.01)

(52) U.S. Cl.
CPC ......... *H04J 11/005* (2013.01); *H04W 72/0426* (2013.01); *H04W 72/082* (2013.01); *H04W 88/085* (2013.01); *H04J 11/0056* (2013.01)

(58) Field of Classification Search
None
See application file for complete search history.

(56) References Cited

U.S. PATENT DOCUMENTS

| | | | |
|---|---|---|---|
| 2009/0161619 A1 | 6/2009 | Noma | |
| 2009/0219905 A1 | 9/2009 | Khandekar et al. | |
| 2010/0195527 A1* | 8/2010 | Gorokhov et al. | 370/252 |
| 2010/0309864 A1* | 12/2010 | Tamaki et al. | 370/329 |
| 2012/0213109 A1* | 8/2012 | Xu et al. | 370/252 |

(Continued)

FOREIGN PATENT DOCUMENTS

| | | |
|---|---|---|
| JP | 2008-28561 A | 2/2008 |
| KR | 10-2009-0067114 A | 6/2009 |

(Continued)

*Primary Examiner* — Clemence Han
(74) *Attorney, Agent, or Firm* — Birch, Stewart, Kolasch & Birch, LLP

(57) ABSTRACT

The present invention relates to a wireless communication system, and more specifically, a method and an apparatus for controlling an inter-cell collision are disclosed. A method for transmitting collision information from a transmission/reception apparatus, which is connected to first and second base stations, according to one embodiment of the present invention, comprises the following steps: obtaining a first scheduling information, generated by the first base station, with regard to a first user equipment, and a second scheduling information, generated by the second base station, with regard to a second user equipment; generating the collision information based on the first scheduling information and the second scheduling information which are obtained; and transferring the collision information to the first and second base stations.

13 Claims, 14 Drawing Sheets

(56) References Cited

U.S. PATENT DOCUMENTS

2013/0208686 A1* 8/2013 Zhang et al. .................. 370/329
2013/0223373 A1* 8/2013 Damnjanovic et al. ....... 370/329
2013/0230013 A1* 9/2013 Seo et al. ...................... 370/329
2013/0301456 A1* 11/2013 Siomina et al. ............... 370/252

FOREIGN PATENT DOCUMENTS

| KR | 10-2010-0118612 A | 11/2010 |
| KR | 10-2010-0129625 A | 12/2010 |

* cited by examiner

FIG. 6
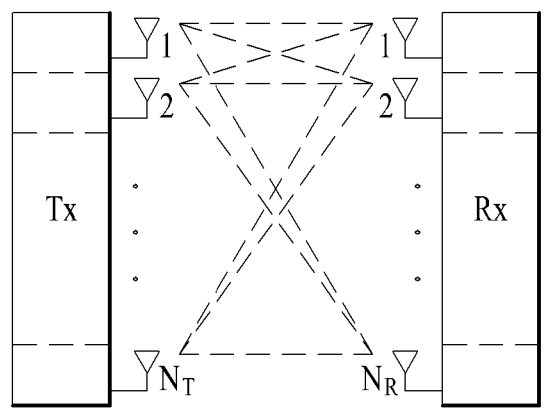
(a)
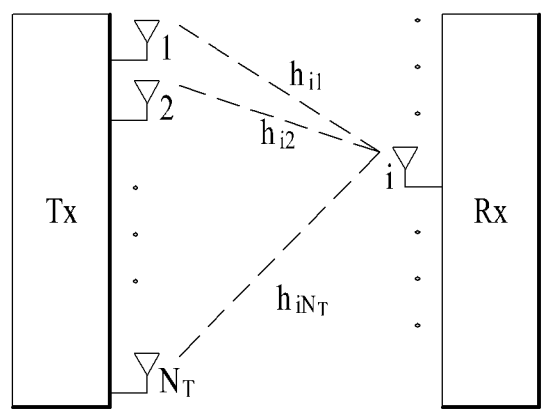
(b)

METHOD AND APPARATUS FOR CONTROLLING INTER-CELL COLLISION IN WIRELESS COMMUNICATION SYSTEM

CROSS-REFERENCE TO RELATED APPLICATIONS

This application is the National Phase of PCT/KR2012/002579 filed on Apr. 5, 2012, which claims priority under 35 U.S.C. 119(e) to U.S. Provisional Application No. 61/472,201 filed on Apr. 6, 2011 and U.S. Provisional Application No. 61/472,202 filed on Apr. 6, 2011, all of which are hereby expressly incorporated by reference into the present application.

TECHNICAL FIELD

The following description relates to a wireless communication system, and more specifically, to a method and apparatus for controlling inter-cell collision.

BACKGROUND ART

A general wireless communication system is defined by operations performed between an eNodeB (eNB) and a user equipment (UE). A radio link from the eNB to the UE is called downlink and a radio link from the UE to the eNB is called uplink. In an advanced wireless communication system, deployment of a relay node (RN) may be considered in order to meet a demand for improved coverage and high data rates. The RN can forward a signal received from an eNB to a UE in the coverage thereof and forward a signal received from the UE in the coverage thereof to the eNB. A radio link between the eNB and the RN is called a backhaul link, Un interface or X2 interface and a radio link between the RN and the UE is called an access link or Uu interface.

FIG. 1 illustrates an exemplary wireless communication system including a wired cell coordinator (WCC) connected to a plurality of eNBs. The WCC can be defined as a device deployed in an interference area of a plurality of eNBs to coordinate inter-cell interference. Inter-cell coordination can be regarded as control of collision between resources used by a plurality of cells. Furthermore, the WCC may include a remote radio head (RRH) function. An RRH corresponds to a wireless transceiver of an eNB, is deployed spaced apart from an eNB server and linked with the eNB server in a wired manner (e.g. using fiber optic cable, coaxial cable or the like). That is, the WCC may be regarded as an RRH connected to a plurality of eNBs. In addition, the WCC may further include a function of relaying a signal between an eNB and a UE. In the specification, the WCC is used as a device having the above-described configuration and functions.

Since the WCC is linked with a plurality of eNBs in a wired manner (which may be referred to as a backhaul link), the WCC can transmit and receive a large amount of signals more rapidly than a wireless backhaul link. Accordingly, radio channel overhearing is considerably decreased, compared to operation of an RN wirelessly connected to an eNB (overhearing refers to reception of a signal, transmitted form a transmitter to a destination node, by another node). Accordingly, the WCC can receive various downlink signals transmitted from eNBs to UEs through wired connection. In addition, the WCC may overhear a wireless uplink signal transmitted from a neighboring UE to an eNB.

DISCLOSURE

Technical Problem

In an area where cells formed by a plurality of eNBs overlap, downlink transmissions or uplink transmissions of the eNBs may collide. In this case, collision between transmissions in cells occurs and thus correct wireless communication cannot be performed.

The WCC can be deployed in an area where a plurality of eNBs interfere with each other to acquire downlink assignment and/or uplink grant scheduling information on the plurality of eNBs and thus inter-cell interference control (ICIC) or collision control through the WCC can be expected. However, a method for achieving ICIC or collision control using the WCC has yet to be provided.

An object of the present invention is to provide a method for controlling collision using the WCC.

The technical problems solved by the present invention are not limited to the above technical problems and those skilled in the art may understand other technical problems from the following description.

Technical Solution

The object of the present invention can be achieved by providing a method for transmitting collision information at a transceiver connected to a first eNB and a second eNB, the method including: obtaining first scheduling information, generated by the first eNB, with regard to a first user equipment (UE), and second scheduling information, generated by the second eNB, with regard to a second UE; generating the collision information based on the obtained first scheduling information and second scheduling information; and transmitting the collision information to the first eNB and the second eNB.

In another aspect of the present invention, provided herein is a transceiver connected to a first eNB and a second eNB, including: a transmission/reception module for transmitting/receiving a signal to/from an external device; and a processor for controlling the transceiver, wherein the processor is configured to obtain first scheduling information, generated by the first eNB, with regard to a first UE, and second scheduling information, generated by the second eNB, with regard to a second UE, to generate collision information based on the obtained first scheduling information and second scheduling information and to transmit the collision information to the first eNB and the second eNB.

The following may be commonly applied to the above-described embodiments of the present invention.

The first scheduling information may include one or more of downlink transmission resource allocation information and uplink transmission resource allocation information about the first UE and the second scheduling information may include one or more of downlink transmission resource allocation information and uplink transmission resource allocation information about the second UE.

The collision information transmitted to the first eNB may include the second scheduling information and the collision information transmitted to the second eNB includes the first scheduling information.

The collision information may include one or more of information indicating whether or not resources scheduled by the first and second eNBs collide with each other, information indicating the resources colliding each other and information indicating the first and second UEs.

The collision information may include updated first scheduling information and updated scheduling information, generated by the transceiver, when resources scheduled by the first and second eNBs collide with each other.

The obtaining of the scheduling information may be performed within a predetermined time range including one or more of a time at which the first scheduling information is transmitted to the first UE and a time at which the second scheduling information is transmitted to the second UE.

The transmitting of the collision information may be performed within a predetermined time range including one or more of a time at which transmission from the first UE to the first eNB is performed and a time at which transmission from the second UE to the second eNB is performed.

Transmission from the first UE or the second UE may correspond to transmission of ACK/NACK information on downlink data or uplink data transmission based on uplink scheduling information.

The method may further include: overhearing one or both of a downlink signal transmitted from the first or second eNB and an uplink signal transmitted from the first or second UE; and reporting information indicating whether or not overhearing has been successfully performed to one or both of the first and second eNBs.

The overheard downlink signal may be retransmitted to one or both of the first and second UEs and the overheard uplink signal may be retransmitted to one or both of the first and second eNBs.

Scheduling information updated by each of the first and second eNBs may be generated based on the collision information.

Acquisition of the first scheduling information and the second scheduling information and transmission of the collision information may be performed through wired connection between the transceiver and the first and second eNBs.

The above description and the following detailed description of the present invention are exemplary and are for the purpose of additional explanation of the claims.

Advantageous Effects

According to the present invention, it is possible to provide a method for control inter-cell interference or collision using a WCC.

The effects of the present invention are not limited to the above-described effects and other effects, which are not described herein, will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 6 illustrates a configuration of a wireless communication system having multiple antennas;

BEST MODE

Figure 1:
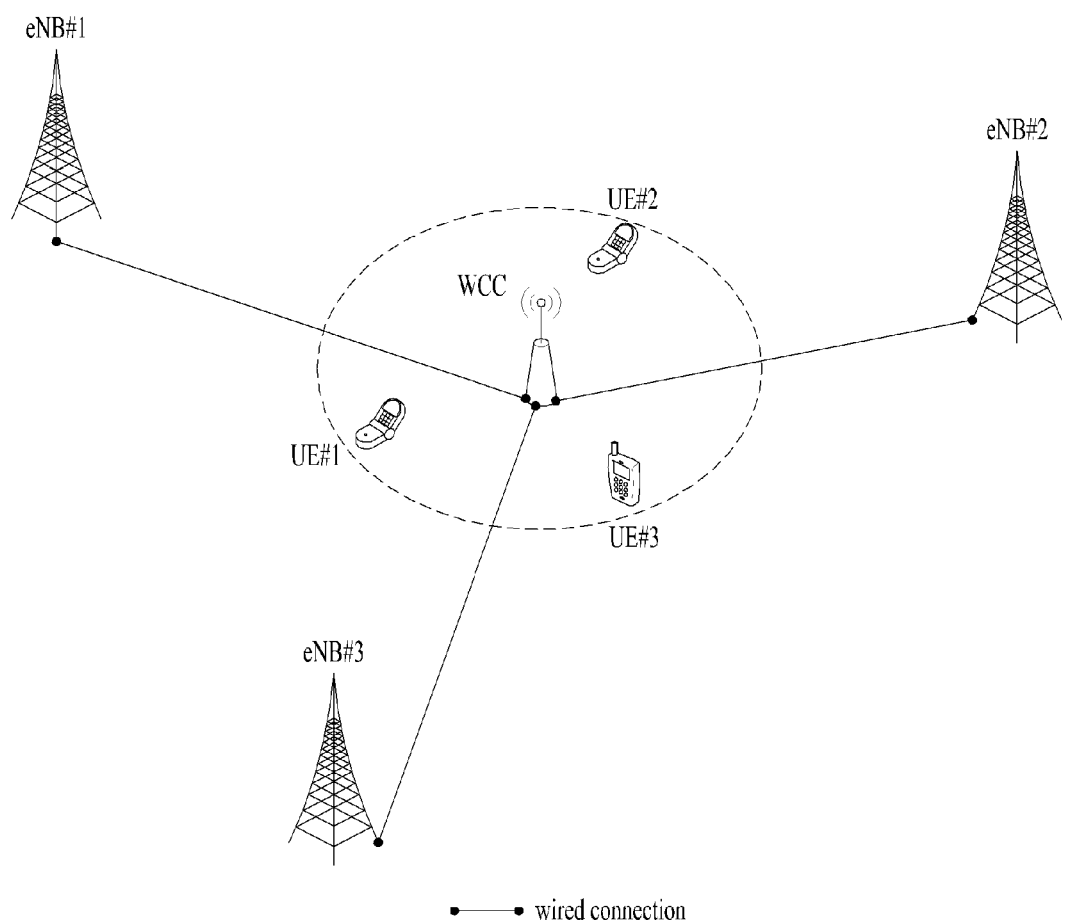
FIG. 1 illustrates an exemplary wireless communication system to which the present invention is applied.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

Figure 2:
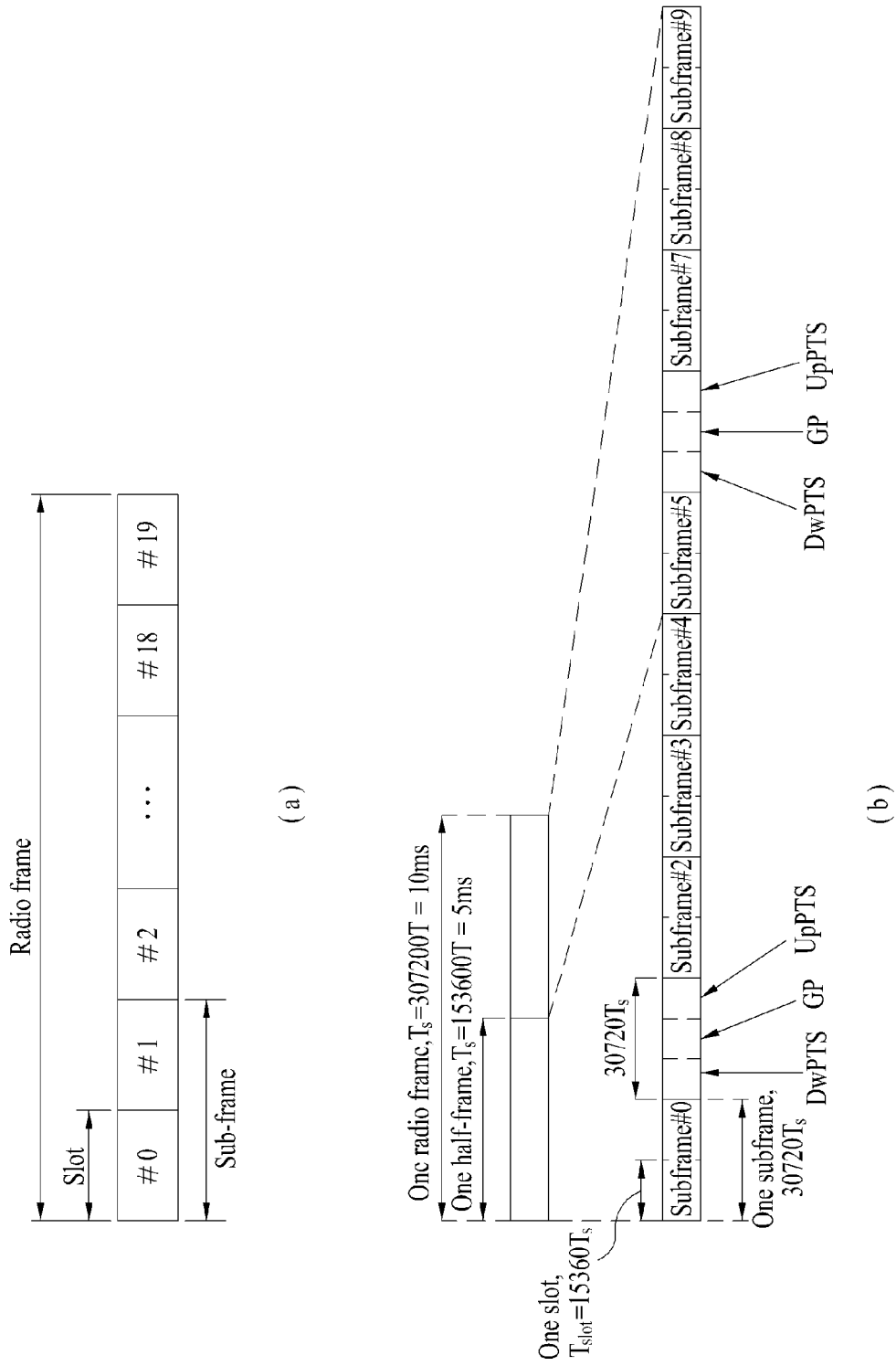
FIG. 2 illustrates a radio frame structure.

A radio frame structure of 3GPP LTE will now be described with reference to FIG. 2.

In a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 2(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of OFDM symbols in the time domain and includes a plurality of resource blocks (RBs) in the frequency domain. Because 3GPP LTE adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

FIG. 2(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The aforementioned radio frame structure is purely exemplary and thus the number of subframes included in a radio frame, the number of slots included in a subframe, or the number of symbols included in a slot may vary.

Figure 3:
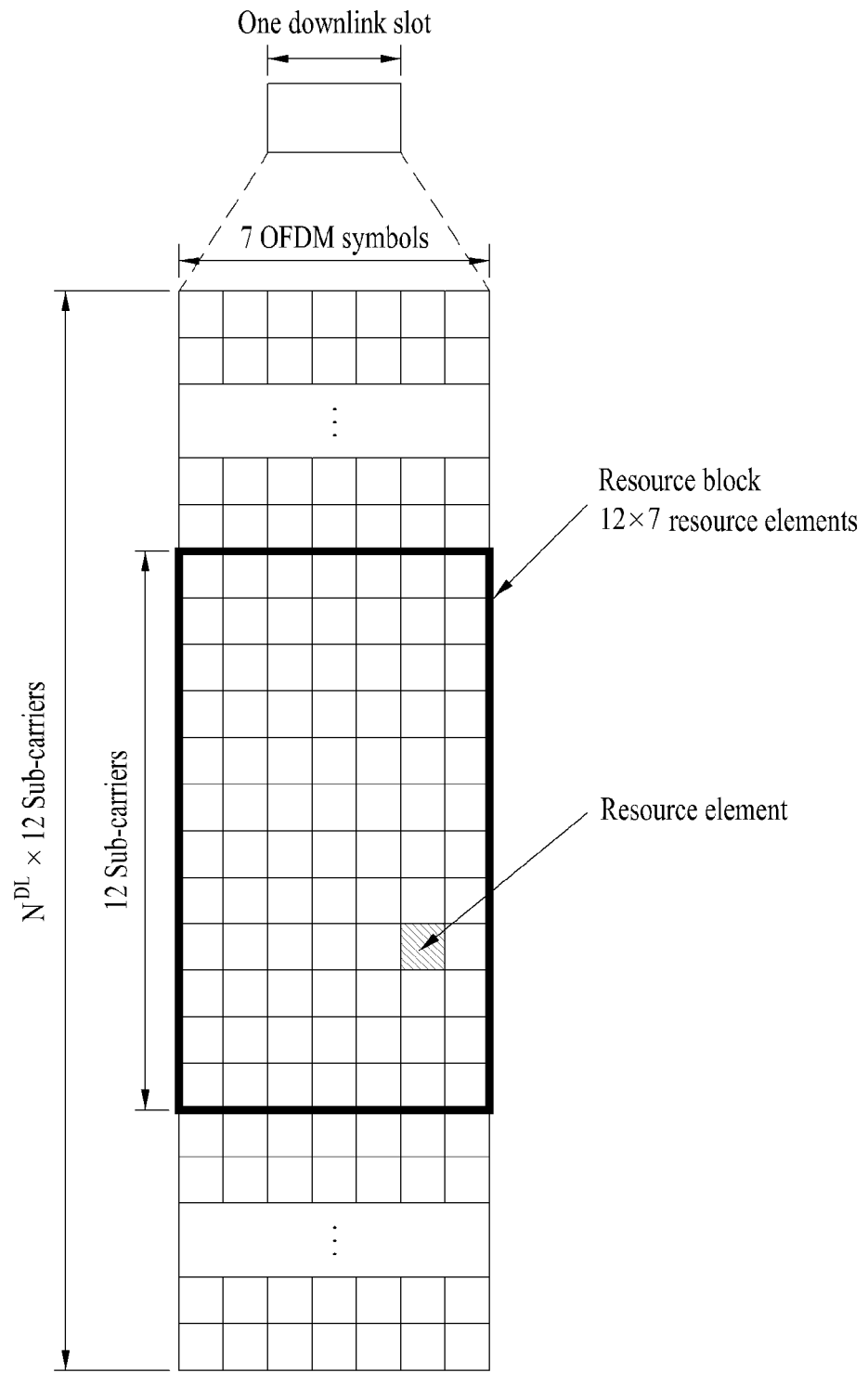
FIG. 3 illustrates a resource grid of a downlink slot.

FIG. 3 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 4:
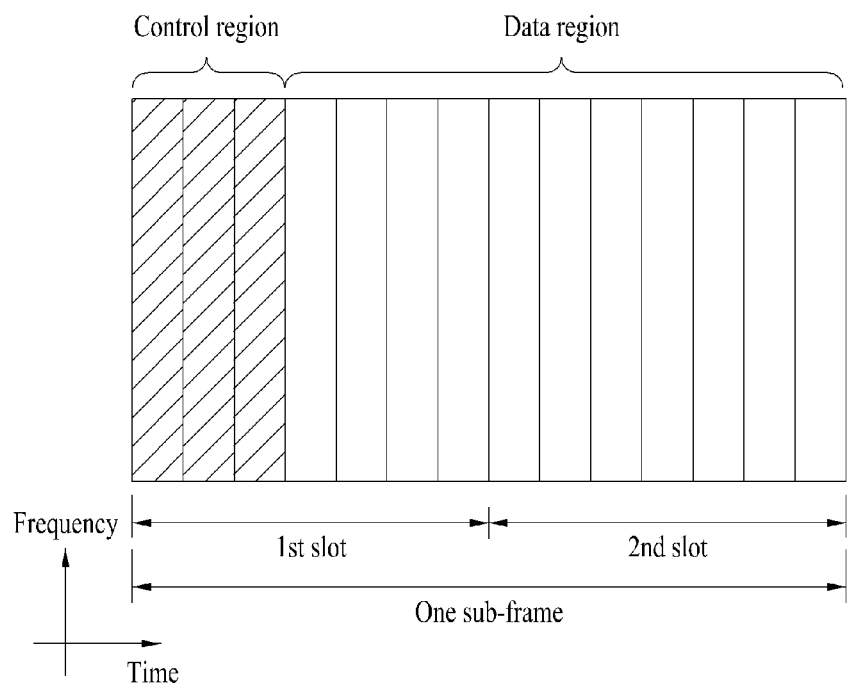
FIG. 4 illustrates a downlink subframe structure.

FIG. 4 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 5:
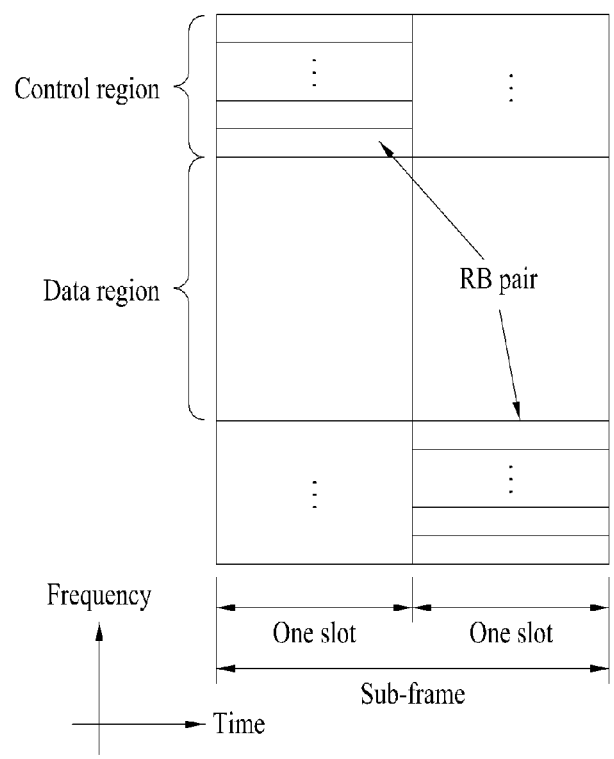
FIG. 5 illustrates an uplink subframe structure.

FIG. 5 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

MIMO System Modeling

FIG. 6 illustrates the configuration of a communication system including multiple antennas.

Referring to FIG. 6(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as follows.

$$\hat{s} = [\hat{s}_1, \hat{s}_2, \ldots, \hat{s}_{N_T}]^T = [Ps_1, Ps_2, \ldots, Ps_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vectors by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas. The channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 6(b) illustrates channels from $N_T$ Tx antennas to an $i^{th}$ Rx antenna. The channels may be represented as vectors and matrices by grouping them. As illustrated in FIG. 6(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix}$$

[Equation 8]

$$= \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix}$$

[Equation 10]

$$= \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \quad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

Sounding Reference Signal (SRS)

An SRS is used for an eNB to measure channel quality and perform uplink frequency-selective scheduling based on the channel quality measurement. The SRS is not associated with data and/or control information transmission. However, the usages of the SRS are not limited thereto. The SRS may also be used for enhanced power control or for supporting various start-up functions of non-scheduled UEs. The start-up functions may include, for example, an initial modulation and coding scheme (MCS), initial power control for data transmission, timing advance, and frequency non-selective scheduling (in which a transmitter selectively allocates a frequency resource to the first slot of a subframe and then pseudo-randomly hops to another frequency resource in the second slot of the subframe).

The SRS may be used for measuring downlink channel quality on the assumption of the reciprocity of a radio channel between the downlink and the uplink. This assumption is valid especially in a time division duplex (TDD) system in which the downlink and the uplink share the same frequency band and are distinguished by time.

A subframe in which a UE within a cell is supposed to transmit an SRS is indicated by cell-specific broadcast signaling. A 4-bit cell-specific parameter 'srsSubframeConfiguration' indicates 15 possible configurations for subframes carrying SRSs in each radio frame. These configurations may provide flexibility with which SRS overhead can be adjusted according to network deployment scenarios. The other one configuration (a $16^{th}$ configuration) represented by the parameter is perfect switch-off of SRS transmission in a cell, suitable for a cell serving high-speed UEs, for example.

Figure 7:
FIG. 7 illustrates a sounding reference signal.

As shown in FIG. 7, an SRS is always transmitted in the last SC-FDMA symbol of a configured subframe. Therefore, an SRS and a DMRS are positioned in different SC-FDMA symbols. PUSCH data transmission is not allowed in an SC-FDMA symbol designated for SRS transmission. Accordingly, even the highest sounding overhead (in the case where SRS symbols exist in all subframes) does not exceed 7%.

Each SRS symbol is generated for a given time unit and frequency band, using a base sequence (a random sequence or Zadoff-Chu (ZC)-based sequence set), and all UEs within a cell use the same base sequence. SRS transmissions in the same time unit and the same frequency band from a plurality of UEs within a cell are distinguished orthogonally by different cyclic shifts of the base sequence allocated to the plurality of UEs. Although the SRS sequences of different cells may be distinguished by allocating different base sequences to the cells, orthogonality is not ensured between the different base sequences.

Relay

A relay is considered in order to improve the coverage of high data rates, group mobility, temporary network deployment, cell edge throughput and/or to provide coverage in new areas.

The relay forwards transmission and reception between an eNB and a UE, and two links (backhaul link and access link) having different attributes are applied to each carrier frequency band. The eNB may include a donor cell. The relay wirelessly accesses a wireless access network through the donor cell.

A backhaul link between the eNB and the relay may be represented as a backhaul downlink when the backhaul link uses a downlink frequency band or a downlink subframe resource and represented as a backhaul uplink when the backhaul link uses an uplink frequency band or an uplink subframe resource. Here, a frequency band is a resource allocated in frequency division duplex (FDD) mode and a subframe is a resource allocated in time division duplex (TDD) mode. Similarly, an access link between the eNB and the relay may be represented as an access downlink when the access link uses a downlink frequency band or a downlink subframe resource and represented as access uplink when the access link uses an uplink frequency band or an uplink subframe resource.

The eNB needs to have uplink reception and downlink transmission functions and the UE needs to have uplink transmission and downlink reception functions. The relay needs to have functions of backhaul uplink transmission to the eNB, access uplink reception from the UE, backhaul downlink reception from the eNB and access downlink transmission to the UE.

In relation to the use of a bandwidth (or spectrum) of a relay, the case where a backhaul link operates in the same frequency band as an access link is referred to as in-band, and the case where the backhaul link operates in different frequency bands from the access link is referred to as out-band. In both the in-band and the out-band, UEs operating according to LTE (e.g., Release-8) should be able to access a donor cell.

The relay may be classified into a transparent relay and a non-transparent relay depending on whether or not the UE recognizes the relay. In the transparent relay, the UE is not aware that it is communicating with a network via the relay, and in the non-transparent relay, the UE is aware that it is communicating with the network via the relay.

In relation to control of the relay, the relay may be divided into a relay as part of a donor cell and a relay for controlling a cell of its own.

The relay as part of the donor cell may have a relay ID but does not have a cell ID of its own. If at least part of Radio Resource Management (RRM) is controlled by an eNB to which the donor cell belongs (while parts of the RRM may be located in the relay), this may be called a relay as part of the donor cell. Desirably, such a relay may support legacy UEs. Smart repeaters, decode-and-forward relays, different types of L2 (second layer) relays, and type-2 relays are examples of this type of relay.

In the case where a relay is in control of its own cells, the relay controls one or several cells and a unique physical-layer cell ID is provided to each of the cells controlled by the relay. The same RRM mechanism is available and in terms of the UE there is no difference in accessing cells controlled by a relay and cells controlled by a normal eNB. The cells controlled by the relay may support the legacy UEs. Self-backhauling relays, L3 (third layer) relays, type-1 relays, and type-1a relays are examples of this type of relay.

A type-1 relay is an in-band relay and controls a plurality of cells, each of which appears as a separate cell, distinct from the donor cell, to UEs. The plurality of cells has its own physical cell ID (defined in LTE Release-8) and the relay may transmit its own synchronization channels, reference signals, etc. In the context of single-cell operation, the UE may receive scheduling information and HARQ feedback directly from the relay and may transmit its own control channels (SR, CQI, ACK/NACK, etc.) to the relay. The type-1 relay appears as a legacy eNB (an eNB operating according to LTE Release-8) to legacy UEs (UEs operating according to LTE Release-8). Namely, the type-1 relay has backward compatibility. Meanwhile, to UEs operating according to an LTE-A system, the type-1 relay appears as an eNB different from the legacy eNB to allow for performance enhancement.

A type-1a relay has the same characteristics as the above-mentioned type-1 relay except that it operates in out-band. The operation of the type-1a relay may be configured to minimize an influence on the operation of an L1 (first layer) or to eliminate such influence.

A type-2 relay, which is an in-band relay, does not have a separate physical cell ID and thus does not create any new cells. The type-2 relay is transparent to the legacy UEs, and the legacy UEs are not aware of the presence of the type-2 relay. The type-2 relay may transmit a PDSCH but does not transmit a Common Reference Signal (CRS) and a PDCCH.

Meanwhile, in order to allow in-band operation of the relay, some resources in the time-frequency space should be reserved for the backhaul link and may be set not to be used for the access link. This is called resource partitioning.

A general principle for resource partitioning in the relay is as follows. The backhaul downlink and access downlink may be time division multiplexed in a single carrier frequency (namely, only one of the backhaul downlink and access downlink is activated at a specific time). Similarly, the backhaul uplink and access uplink may be time division multiplexed in a single carrier frequency (namely, only one of the backhaul uplink and access uplink is activated at a specific time).

In multiplexing the backhaul links for FDD, backhaul downlink transmission and backhaul uplink transmission are carried out in a downlink frequency band and an uplink frequency band, respectively. In multiplexing the backhaul links for TDD, backhaul downlink transmission and backhaul uplink transmission are carried out in downlink subframes of the eNB and relay and uplink subframes of the eNB and relay, respectively.

In the case of an in-band relay, for example, if reception of the backhaul downlink from the eNB and transmission of the access downlink to the UE are simultaneously performed in a predetermined frequency band, a signal transmitted from a transmitting end of the relay may be received in a receiving end of the relay and thus signal interference or Radio Frequency (RF) jamming may occur at an RF front end of the relay. Similarly, if reception of the access uplink from the UE and transmission of the backhaul uplink to the eNB are simultaneously performed in a predetermined frequency band, signal interference may occur at the RF front end of the relay. Accordingly, in the relay, simultaneous transmission and reception in a single frequency band is difficult to achieve unless sufficient separation between a transmission signal and a reception signal is provided (e.g., unless a transmission antenna and a reception antenna are sufficiently separated from each other geographically (for example, by installing them above/below ground)).

Figure 8:
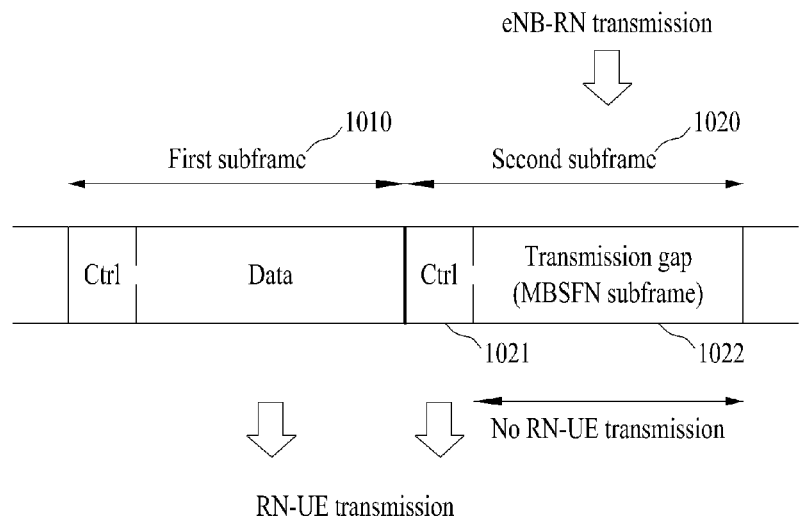
FIG. 8 illustrates resource partitioning for a relay.

One method for solving the problem of signal interference is to allow the relay not to transmit a signal to UEs while receiving a signal from the donor cell. That is, a gap may be generated in transmission to the UEs from the relay and the UEs (including the legacy UEs) may be set not to expect any transmission from the relay during the gap. In FIG. 8, a first subframe 1010 is a normal subframe in which a downlink (i.e. access downlink) control signal and data are transmitted from the relay to the UE and a second subframe 1020 is a multicast broadcast single frequency network (MBSFN) subframe. A control signal is transmitted from the relay to the UE in a control region 1021 of the downlink subframe, whereas no signal is transmitted from the relay to the UE in the remaining region 1022 of the downlink subframe. Here, in the case of a legacy UE, since transmission of a physical downlink control channel (PDCCH) is expected in all downlink frames (in other words, the relay needs to support legacy UEs belonging to the coverage thereof such that the legacy UEs receive and measure PDCCHs in every subframe), it is necessary to transmit a PDCCH in all downlink subframes for correct operation of legacy UEs. Accordingly, even in a subframe (second subframe 1020) configured for downlink (i.e. backhaul downlink) transmission from the eNB to the relay, the relay needs to perform access downlink transmission instead of backhaul downlink reception in a period corresponding to first N (N=1, 2 or 3) OFDM symbols of the subframe. For this, since a PDCCH is transmitted from the relay to the UE in the control region 1021 of the second subframe, backward compatibility for legacy UEs served by the relay can be provided. The relay can receive a signal transmitted from the eNB in the remaining region 1022 of the second subframe since no signal is transmitted from the relay to the UE in the region 1022. Accordingly, through such a resource partitioning scheme, access downlink transmission and backhaul downlink reception can be prevented from being simultaneously performed in an in-band relay.

The second subframe 1022 using an MBSFN subframe will be described in detail hereinafter. The MBSFN subframe is a subframe for multimedia broadcast and multicast service (MBMS) for simultaneously transmitting the same signal in multiple cells. The control region 1021 of the second subframe may be regarded as a relay non-hearing period. The relay non-hearing period refers to a period in which a relay transmits an access downlink signal instead of receiving a backhaul downlink signal. The relay non-hearing period can be set to a length of 1, 2 or 3 OFDM symbols, as described above. The relay can perform access downlink transmission to the UE in the relay non-hearing period 1021 and receive a backhaul downlink signal from the eNB in the remaining region 1022. Here, since the relay cannot simultaneously perform transmission and reception in the same frequency band, time is taken for the relay to switch from transmission mode to reception mode. Accordingly, a guard time GT needs to be set to the first part of the backhaul downlink reception region 1022 such that the relay can perform transmission/reception mode switching in the region 1022. Similarly, even when the relay receives a backhaul downlink signal from the eNB and transmits an access downlink signal to the UE, a guard time (GT) for reception/transmission mode switching of the relay can be set. The duration of the GT may be set to a value in the time domain. For example, the duration of the GT can be set to k (k=1) time sample (Ts) or one or more OFDM symbols. A GT of the last part of the subframe may not be defined or set when relay backhaul downlink subframes are continuously configured or according to a predetermined subframe timing alignment relationship. This GT may be defined only in a frequency region set for backhaul downlink subframe transmission in order to maintain backward compatibility (legacy UEs cannot be supported when a GT is set in an access downlink period). The relay can receive a PDCCH and a PDSCH from the eNB in the backhaul downlink reception period 1022 other than the GT. Particularly, a PDCCH for the relay can be represented as a relay-PDCCH (R-PDCCH) in the sense of a relay dedicated physical channel.

Hybrid Automatic Retransmission Request (HARQ) Operation

The following HARQ operation can be applied as a method for controlling data reception failure. When a data transmitter receives an ACK signal from a data receiver after transmitting a packet to the data receiver, the data transmitter can transmit a new packet. If the data transmitter receives a NACK signal from the data receiver, the data transmitter can retransmit the previously transmitted packet. In this case, a packet to which encoding according to forward error correction (FEC) has been applied can be retransmitted. Accordingly, the data receiver decodes a received packet and transmits an ACK signal upon successfully decoding the received packet. When the data receiver does not successfully decode the received packet, the data receiver transmits a NACK signal and stores the received packet in a buffer. Upon reception of a retransmitted packet according to the NACK signal, the data receiver combines the retransmitted packet with the packet stored in the buffer and decodes the combined packet to improve packet reception success rate.

HARQ can be classified into synchronous HARQ and asynchronous HARQ according to retransmission timing. In synchronous HARQ, when initial transmission fails, retransmission is performed at a time determined by the system. For example, when it is determined that retransmission is performed every fourth time unit (e.g. subframe) from when initial transmission fails, it is not necessary to additionally inform a receiver of information about retransmission timing. Accordingly, if a data transmitter receives a NACK signal, the data transmitter retransmits a packet every fourth time unit until an ACK signal is received. According to asynchronous HARQ, information about retransmission timing is additionally scheduled. Accordingly, packet retransmission timing corresponding to a NACK signal can be varied according to various conditions such as channel state, etc.

HARQ can be classified into adaptive HARQ and non-adaptive HARQ according to whether channel state is reflected in the quantity of resources used for retransmission. In non-adaptive HARQ, an MCS level of a retransmitted packet, the number of used resource blocks, etc. determined during initial transmission is not varied. For example, if a transmitter transmits data using 8 resource blocks during initial transmission, the transmitter retransmits data using 8 resource blocks during retransmission. In adaptive HARQ, a packet modulation scheme and the number of used resource blocks vary with channel state. For example, even when transmission is initially performed using 8 resource blocks, retransmission can be performed using more or less than 8 resource blocks.

In data packet transmission through HARQ, a transmitter can segment a data packet into sub-packets each having a predetermined size and transmit or retransmit the sub-packets. A receiver can combine the sub-packets received from the transmitter into the data packet and attempt to decode the data packet.

A plurality of sub-packets used for initial transmission and retransmission according to HARQ is generated per codeword packet. The generated sub-packets can be discriminated using a sub-packet length and a sub-packet start point. A sub-packet that can be discriminated is called a redundancy version (RV). A receiver can attempt to decode a whole codeword by receiving different RVs and combining the received RVs. For example, a HARQ operation can be performed in such a manner that only sub-packets corresponding to a difference between a whole codeword packet and a previously received sub-packet are received and decoding of the codeword packet is attempted. This method is referred to as incremented redundancy (IR) HARQ.

Collision Control Through WCC

Figure 9:
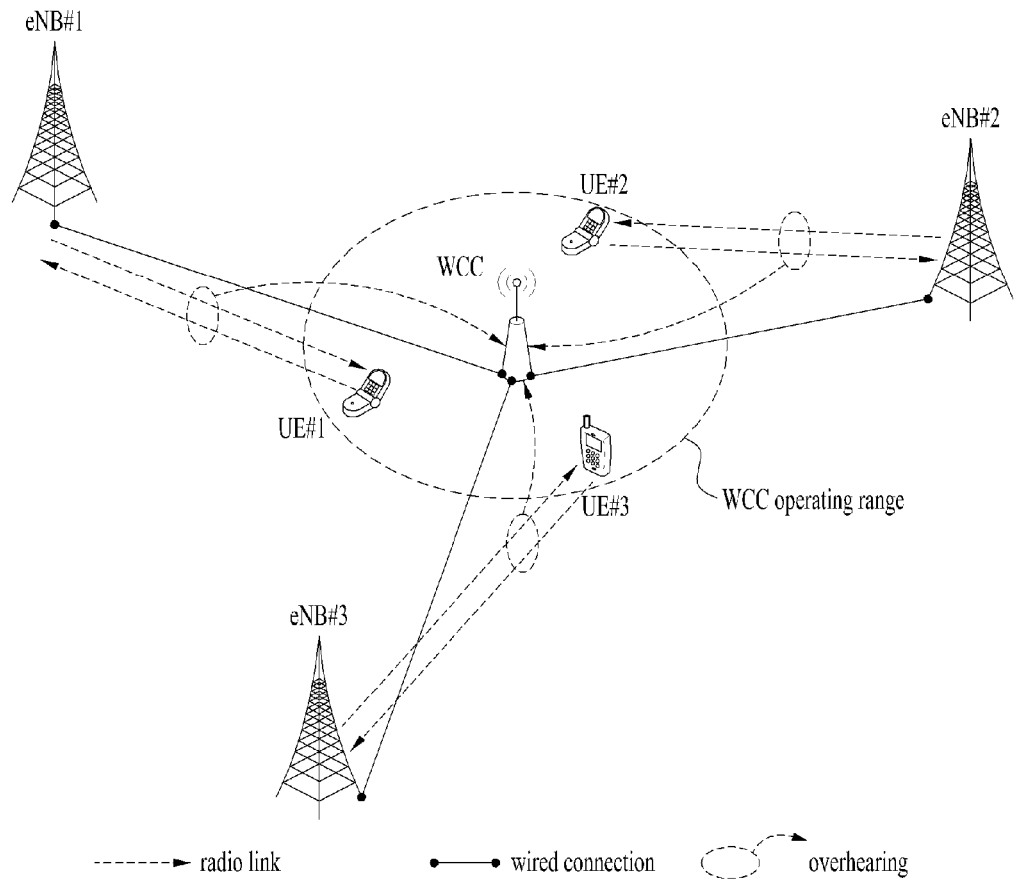
FIG. 9 illustrates setting of an operation range of a wireless communication system including a WCC.

FIG. 9 illustrates setting of an operation range of a wireless communication system including a WCC. It is assumed that a first UE UE#1 regards a first eNB eNB#1 as a serving cell, a second UE UE#2 regards a second eNB eNB#2 as a serving cell and a third UE UE#3 regards a third eNB eNB#3 as a serving cell in FIG. 9. In addition, the WCC is linked to a plurality of eNBs eNB#1, eNB#2 and eNB#3 in a wired manner. The eNBs eNB#1, eNB#2 and eNB#3 can transmit/receive uplink/downlink signals to the UE#1, UE#2 and UE#3 through radio links.

The WCC does not establish a cell thereof although it functions as a shared RN (SRN) of the eNBs. The operating range of the WCC, shown in FIG. 9, shows that UEs included therein are affected by collision control performed by the WCC.

For example, it can be assumed that the three eNBs eNB#1, eNB#2 and eNB#3 are connected to the WCC in a wired manner and rates of cell loads of the eNBs eNB#1, eNB#2 and eNB#3 are 2:1:1. The cell loads can be determined in consideration of a UE that manages the WCC (or SRN) or all cells. In this case, the WCC (or SRN or RRH) can transmit/receive signals to/from the eNBs through TDM using time domain resource partitioning and rates of time resources allocated to the eNBs can be set as eNB#1:eNB#2:eNB#3=2:1:1. In this manner, WCC (or SRN or RRH) utilization efficiency can be maximized.

In the example of FIG. 9, the WCC can obtain all downlink signals (e.g. control information and data) transmitted from the eNBs to the UEs through wired connection as necessary without time restriction. In most cases, the WCC can acquire a downlink signal immediately prior to transmission of the downlink signal. While the WCC is connected to the eNBs in a wired manner, the WCC may have a function of overhearing a downlink signal transmitted from eNBs to UEs. For example, only information (e.g. DL/UL scheduling information) that needs to be rapidly shared can be transmitted through wired connection between the WCC and the eNBs and other signals (e.g. DL/UL data) can be overheard by the WCC. Furthermore, the WCC may have an additional function of overhearing uplink signals transmitted from neighboring UEs (e.g. UE#1, UE#2 and UE#3) to eNBs. Here, the number and types of channels, the number of UEs, etc., which can be overheard by the WCC on uplink and/or downlink, may depend on capabilities of the WCC. Information about a channel overheard by the WCC may be shared between the plurality of eNBs and the WCC.

In addition, the WCC can determine UEs (i.e. UEs included in the operating range of the WCC) that will be control targets of the WCC by overhearing and measuring SRSs transmitted from UEs to eNBs and the determination result can be shared with the eNBs.

As described above, the WCC can determine the operating range thereof through exchange of information (e.g. cell coverages of eNBs, information on capability of the WCC, etc.) with the eNBs connected thereto in a wired manner. Alternatively, UEs or a UE group to be controlled/managed by the WCC may be previously determined by eNBs and signaled to the WCC. Otherwise, UEs or a UE group managed by the WCC may be selected using a hybrid of the above-mentioned two methods. That is, the WCC operating range (or UEs or a UE group to be managed by the WCC) can be determined through information exchange between the WCC and eNBs and the WCC and/or eNBs can determine the WCC operating range. In addition, the WCC operating range can be determined before the WCC executes the collision control function.

Collision between downlink transmissions of a plurality of eNBs or collision between uplink transmissions of a plurality of UEs can be controlled by the WCC. Collision between uplink/downlink transmissions means that uplink/downlink transmissions in different cells are performed in the same resource region (resource region of time, frequency and spatial domains). A description will be given of examples of the present invention in cases of downlink and uplink.

Collision Control Through A WCC—Downlink

Figure 10:
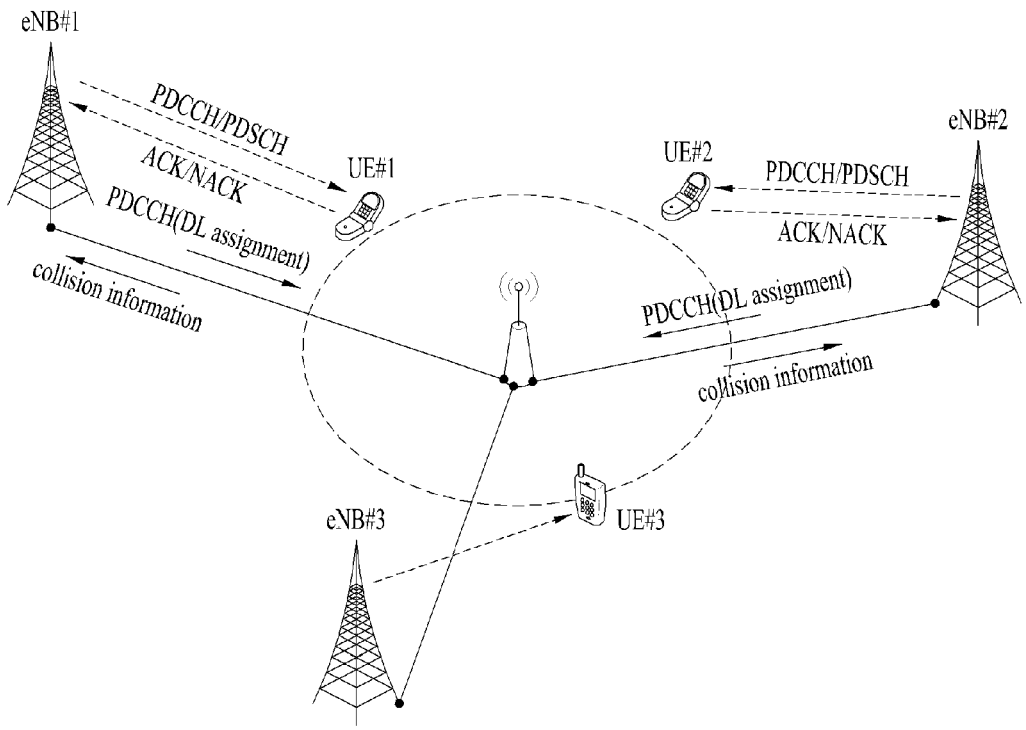
FIG. 10 illustrates collision control using a WCC when collision between downlink transmissions of a plurality of eNBs occurs.

FIG. 10 illustrates collision control using a WCC when collision between downlink transmissions of a plurality of eNBs occurs.

FIG. 10 shows that scheduling information about downlink transmission of each eNB is transmitted through a DL assignment PDCCH, a PDSCH is transmitted in a resource region indicated by the PDCCH from the corresponding eNB to a UE, and ACK/NACK information on the PDSCH is transmitted from the UE to the eNB. In the example of FIG. 10, it is assumed that collision occurs between downlink transmission from eNB#1 to UE#1 and downlink transmission from eNB#2 to UE#2. That is, UE#3 is present outside the operating range of the WCC or downlink transmission from eNB#3 to UE#3 does not collide with downlink transmissions of other eNBs. However, the configuration of FIG. 10 is exemplary and the principle of the present invention can be equally applied to a case in which collision among downlink transmissions from three or more eNBs occurs.

It is assumed that eNB#1 and eNB#2 cannot be immediately aware of collision between downlink transmissions scheduled thereby. On the other hand, the WCC can rapidly obtain DL assignment scheduling information (i.e. first scheduling information) of eNB#1 and DL assignment scheduling information (i.e. second scheduling information) of eNB#2. Accordingly, the WCC can generate collision information in various formats and report the collision information to eNB#1 and eNB#2 through wired connection.

For example, the WCC can simply transmit DL assignment scheduling information (or downlink resource allocation (RA) information) received from each eNB to all the eNBs such that each eNB determines whether or not collision occurs.

Alternatively, the WCC can determine whether or not the same resource is used for downlink allocation of the plurality of eNBs and whether or not overlapping layers are present by analyzing the DL assignment scheduling information (or RA information) received from each eNB. Upon determination of collision between transmitted resources, the WCC can report a UE causing resource collision to the plurality of eNBs. In addition, the WCC may report information indicating the position of a resource causing collision, for example, a resource index and/or additional information.

Alternatively, when the WCC includes a scheduler having a resource allocation algorithm or has a function corresponding thereto, the WCC can determine resources in which collision does not occur using the resource allocation algorithm and feed back information on the resources to the plurality of eNBs. An eNB may conform to scheduling information determined by the WCC or determine resources in which no collision occurs and configure new scheduling information. To achieve this, scheduling information needs to be shared between the WCC and the plurality of eNBs and the WCC and the eNBs need to interoperate organically.

Figure 11:
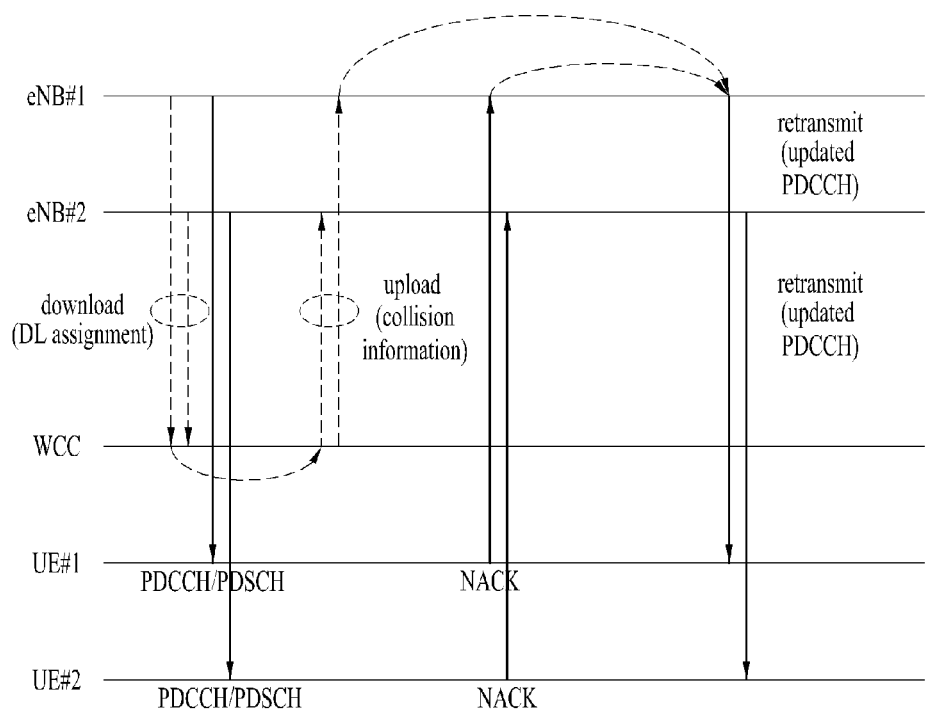
FIGS. 11, 12 and 13 illustrate operations of a WCC when inter-cell downlink collision occurs.
Figure 12:
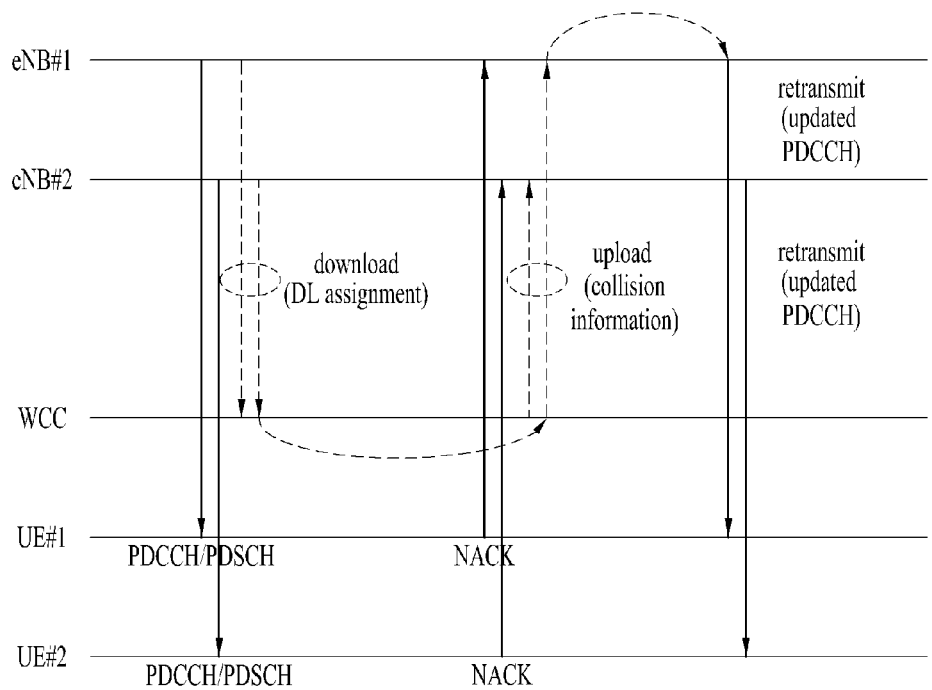

FIGS. 11 and 12 illustrate operations of the WCC in case of inter-cell downlink collision. The examples of FIGS. 11 and 12 are based on the assumption that the WCC does not perform overhearing and does not have a PDSCH forwarding function.

In the examples of FIGS. 11 and 12, a PDCCH/PDSCH may be transmitted from an eNB to a UE in subframe #n and a HARQ response to the PDCCH/PDSCH may be transmitted from the UE to the eNB in subframe #n+4. In the examples of FIGS. 11 and 12, it is assumed that there is a high possibility that the UE fails to decode the PDSCH and NACK is generated as a HARQ response to the PDSCH since collision between downlink transmissions from two eNBs is supposed.

The eNB may perform downlink retransmission to the UE upon reception of the NACK information in subframe #n+8. The timing relationship between HARQ operations is exemplary and retransmission timing may be changed as necessary.

Referring to FIGS. 11 and 12, the WCC may download downlink scheduling PDCCHs from a plurality of eNBs eNB#1 and eNB#2 through wired connection. Here, while information on a DL assignment PDCCH DCI format can be downloaded, only RA information corresponding to information regarding resources used for downlink transmission may be downloaded. The WCC can generate collision information using downlink scheduling information from the eNBs or by processing the downlink scheduling information. The WCC can upload the generated collision information to each eNB. For example, the collision information may be i) downlink scheduling information of an eNB, ii) ID of a UE causing collision, information on whether or not collision occurs and/or ID of a resource in which collision occurs or iii) updated scheduling information determined or recommended by the WCC.

Upon reception of the collision information, an eNB can be aware of collision between previous downlink transmission thereof and downlink transmission of another eNB and allocate a resource different from that used for previous downlink transmission to perform downlink retransmission. If the collision information from the WCC is not reported to the eNB, the eNB allocates the same downlink resource as those used for previous downlink transmission during downlink retransmission, and thus collision between previous downlink transmission of the eNB and downlink transmission of the other eNB may continuously occur or collision may be controlled after multiple collisions. However, downlink collision can be rapidly coordinated or prevented when the collision information from the WCC is used according to the present invention.

Information exchange through wired connection between an eNB and the WCC need not be fixed to specific timing and can be performed within a specific time range. Furthermore, since a radio link from an eNB to a UE is separated from a wired link between the eNB and the WCC, transmission on the wired link can be performed at an independent timing irrespective of transmission on the radio link.

Specifically, the WCC can download downlink scheduling information within a time range prior to or following subframe #n (e.g. immediately before or after subframe #n or both before and after subframe #n). For example, the WCC can download downlink scheduling information immediately prior to downlink transmission from an eNB to a UE (i.e. immediately prior to subframe #n) (FIG. 11). Otherwise, the WCC can download downlink scheduling information immediately after downlink transmission from the eNB to the UE (i.e. immediately after subframe #n) (FIG. 12). Alternatively, the WCC can download downlink scheduling information simultaneously with downlink transmission from the eNB to the UE (not shown).

In addition, the WCC can upload the collision information within a time range between subframe #n and subframe #n+8. Considering a processing time necessary for an eNB to which the collision information is uploaded to update downlink scheduling information for PDSCH retransmission, collision information upload timing of the WCC may be limited to prior to subframe #n+8−k (k being the processing time of the eNB, for example, 4).

For example, the WCC can upload the collision information to an eNB before a UE transmits HARQ ACK/NACK information to the eNB (i.e. prior to subframe #n+4) (FIG. 11). Otherwise, the WCC can upload the collision information to the eNB after the UE transmits the HARQ ACK/NACK information to the eNB (i.e. after subframe #n+4) (FIG. 12). In the case of FIG. 12, determination as to whether or not the collision information is uploaded from the WCC is possible based on HARQ ACK/NACK information received at the eNB, thereby reducing traffic load on a wired backhaul link. Specifically, when the eNB receives HARQ NACK information, the collision information can be fed back from the WCC to the eNB and reflected in scheduling for retransmission. If the eNB receives HARQ ACK information, the eNB need not perform retransmission and thus the collision information is not fed back from the WCC to the eNB. In this case, the eNB can inform the WCC that there is no need to upload the collision information.

In the examples of FIGS. 11 and 12, the WCC may download downlink scheduling information of the plurality of eNBs and upload the collision information generated from the downlink scheduling information prior to downlink transmissions of the eNBs. In this case, downlink transmission collision can be prevented (there is a high possibility that collision occurs during initial transmission in the above-described examples). However, when an eNB generates downlink scheduling information immediately prior to downlink transmission, a time necessary for the WCC to previously obtain the downlink scheduling information and to generate collision information may be insufficient. Accordingly, the examples of FIGS. 11 and 12 may be a universal solution that can be selected for downlink collision avoidance using the WCC.

Figure 13:
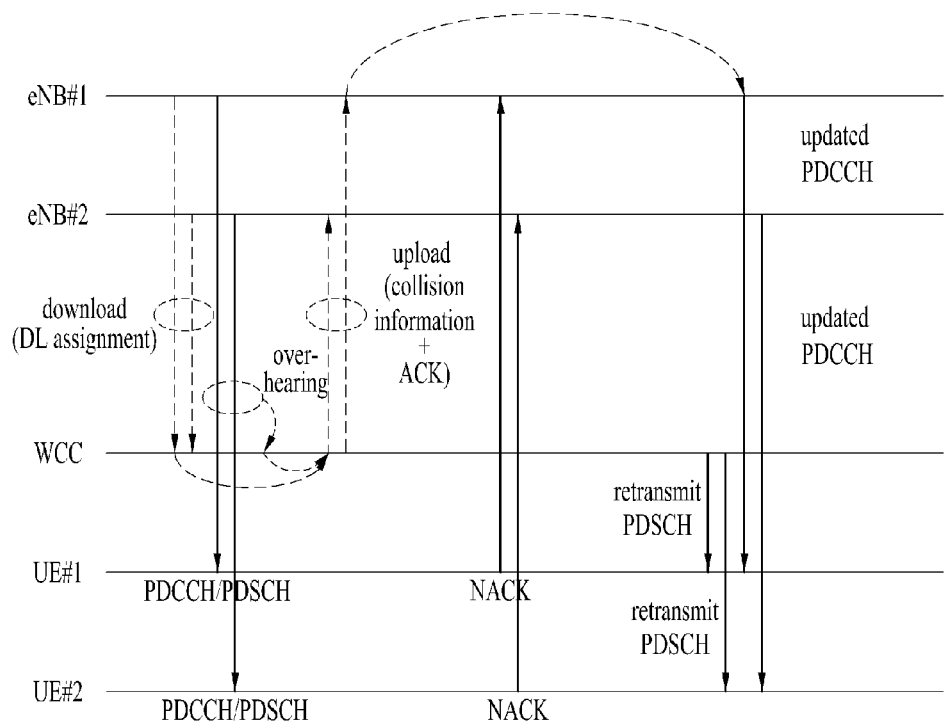

FIG. 13 illustrates an operation of the WCC in case of inter-cell downlink collision. The example of FIG. 13 is based on the assumption that the WCC performs overhearing and has the function of forwarding a PDSCH.

While the example of FIG. 13 is described on the basis of the timing relationship of FIG. 11, the same description may be applied to the WCC operating according to the timing relationship of FIG. 12. That is, the timing at which the WCC downloads downlink scheduling information of a plurality of eNBs may be included in a time range before and after downlink transmission from the eNBs to UEs and the timing at which the WCC uploads collision information to the eNBs may be included in a time range before and after transmission of HARQ ACK/NACK information from the UEs to the eNBs.

The example of FIG. 13 is explained on the basis of parts different from the example of FIG. 11 and description of redundant parts is omitted. In the example of FIG. 13, the WCC can overhear PDCCHs/PDSCHs transmitted from the plurality of eNBs to the UEs through radio links. Upon overhearing of the PDCCHs/PDSCHs, the WCC can signal ACK/NACK information on the PDSCHs to the eNBs. The ACK/NACK information generated by the WCC can be uploaded to the eNBs along with or separately from the collision information. Alternatively, the ACK/NACK information generated by the WCC can be uploaded to the eNBs at the timing of transmission of ACK/NACK information from the UEs (e.g. subframe #n+4).

Each eNB can transmit an updated PDCCH/PDSCH in consideration of NACK information received from the corresponding UE and the collision information uploaded from the WCC. Transmission of the updated PDCCH/PDSCH may be performed in a resource other than a resource in which collision occurs. Simultaneously, the WCC can retransmit PDSCHs to the UEs in resources in which collision does not occur. When the eNB receives ACK information from the UE, PDSCH retransmission is not performed and transmission of new data can be carried out.

When the WCC successfully overhears a PDSCH, ACK/NACK information generated by the WCC can be determined as ACK at all times irrespective of whether or not a downlink signal from an eNB is successfully decoded by a UE. That is, the WCC may generate and upload ACK information in order to indicate that the WCC has successfully overheard the PDSCH and intends to participate in PDSCH retransmission or generate and upload fake ACK information indicating that the UE has successfully decoded the PDSCH irrespective of whether or not the UE has successfully decoded the PDSCH.

In the latter case, an eNB that has received the ACK information can recognize that the UE has successfully decoded the PDSCH and transmit new data without performing retransmission. In this case, the ACK information uploaded by the WCC may take precedence over NACKs actually transmitted from UEs. When a UE cannot successfully decode a PDSCH transmitted from an eNB (the WCC may overhear a HARQ response of the UE), the WCC can retransmit the overheard PDSCH transmitted from the eNB to the UE.

Collision Control Through a WCC—Uplink

Figure 14:
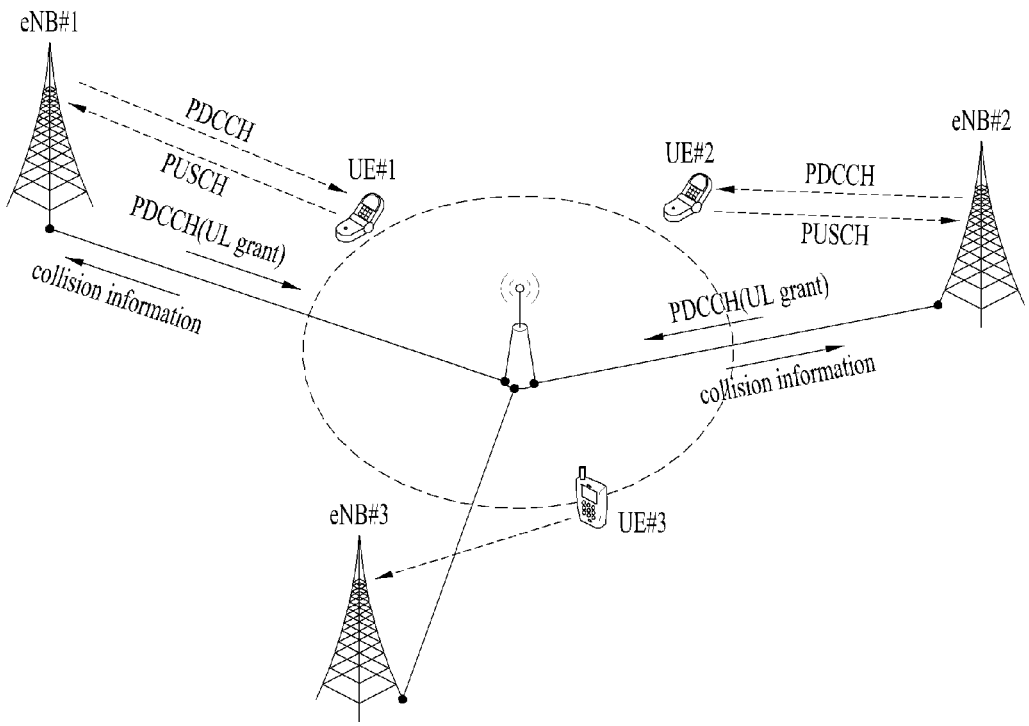
FIG. 14 illustrates collision control using a WCC when collision between uplink transmissions scheduled by a plurality of eNBs occurs.

FIG. 14 is a diagram illustrating collision control using a WCC when collision between uplink transmissions scheduled by a plurality of eNBs occurs.

In the example of FIG. 14, uplink scheduling information of each eNB is transmitted to a corresponding UE through a UL grant PDCCH and each UE performs PUSCH transmission using a resource indicated by a corresponding PDCCH. The example of FIG. 14 assumes that collision between uplink transmission from UE#1 to eNB#1 and uplink transmission from UE#2 to eNB#2 occurs. That is, UE#3 may be present outside the operating range of the WCC or uplink transmission from UE#3 to eNB#3 does not collide with uplink transmission of another UE. However, this is exemplary and the principle of the present invention can be equally applied to a case in which collision among uplink transmissions from three or more UEs occurs.

It is assumed that eNB#1 and eNB#2 cannot be immediately aware of collision between uplink transmissions scheduled thereby. However, the WCC can rapidly acquire UL grant scheduling information (i.e. first scheduling information) of eNB#1 and UL grant scheduling information (i.e. second scheduling information) of eNB#2. Accordingly, the WCC can generate collision information in various forms and report the collision information to eNB#1 and eNB#2 through wired connection. The collision information may be i) UL grant scheduling information of an eNB, ii) ID of a UE causing collision, information on whether or not collision occurs and/or ID of a resource causing collision or iii) updated scheduling information determined or recommended by the WCC.

Figure 15:
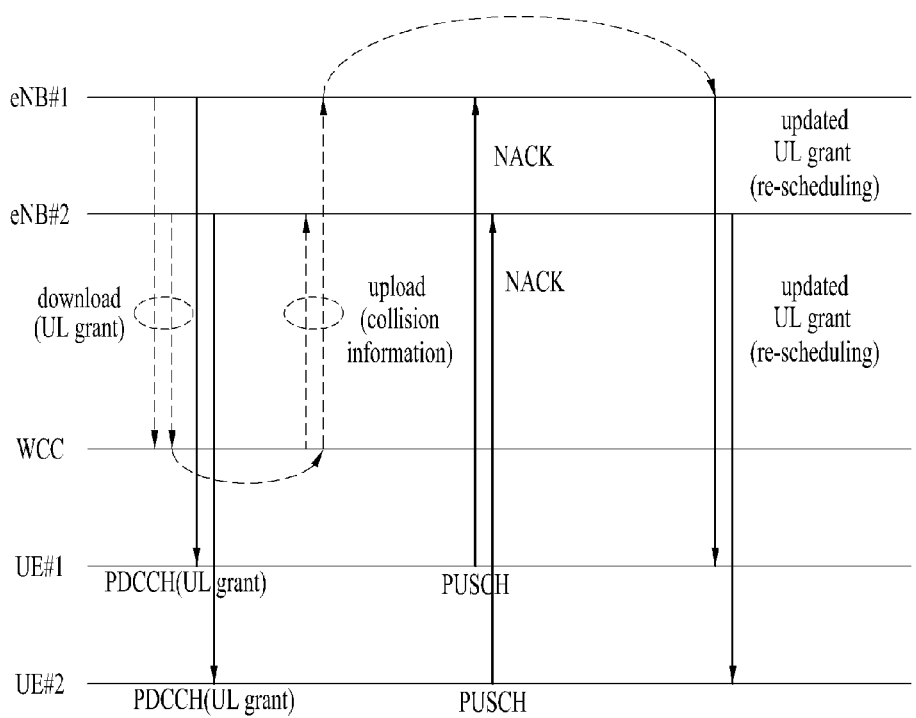
FIGS. 15 to 18 illustrate operations of a WCC when inter-cell uplink collision occurs.
Figure 16:
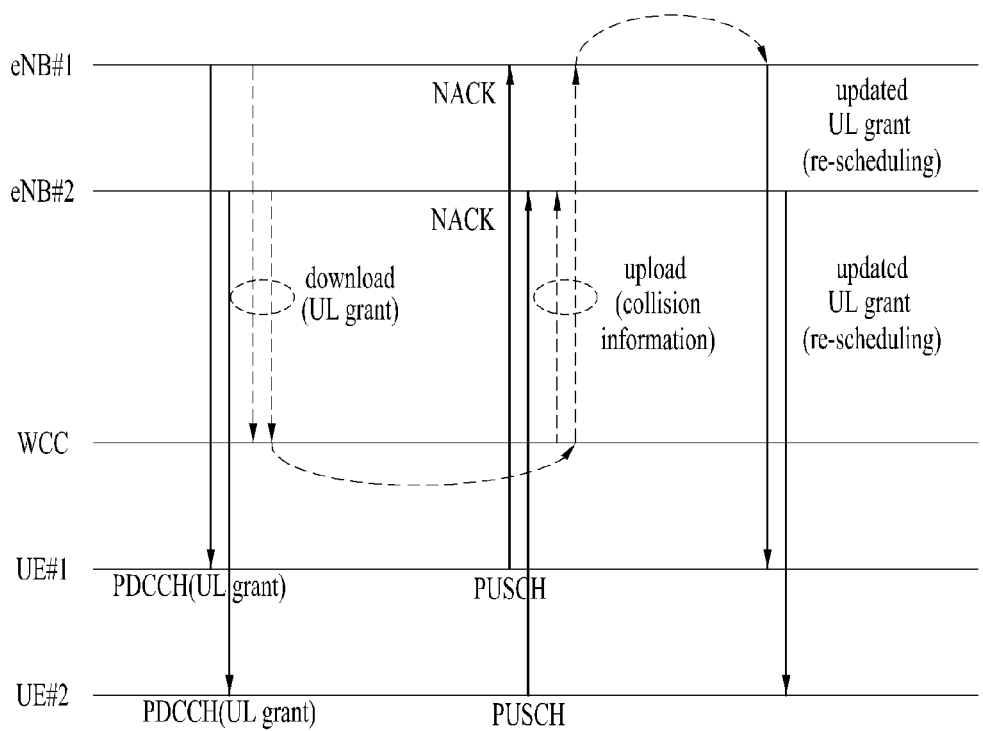

FIGS. 15 and 16 are diagrams illustrating operations of the WCC when inter-cell uplink collision occurs. Examples of FIGS. 15 and 16 assume a case in which the WCC does not perform overhearing and does not have the function of forwarding a PUSCH.

In the examples of FIGS. 15 and 16, an eNB may transmit a PDCCH (UL grant) to a UE in subframe #n and the UE may transmit a PUSCH to the eNB in subframe #n+4. The eNB can attempt to decode the PUSCH transmitted from the UE to generate HARQ response (ACK or NACK) information. Since the examples of FIGS. 15 and 16 show a case in which collision between uplink transmissions from two eNBs occurs, it is assumed that there is a high possibility that each eNB cannot successfully decode a PUSCH transmitted from the corresponding UE and thus NACK is generated as a HARQ response. In this case, each eNB can transmit a UL grant to the corresponding UE in subframe #n+8 such that the UE can retransmit the previously transmitted PUSCH. This HARQ operation timing relationship is exemplary and retransmission time may be changed as necessary.

In the examples of FIGS. 15 and 16, the WCC can download uplink scheduling PDCCHs from the plurality of eNBs eNB#1 and eNB#2 through wired connection. Here, while information on all UL grant PDCCH DCI formats may be downloaded, only RA information corresponding to information on a resource in which uplink transmission is performed can be downloaded. The WCC can generate collision information by using or processing the uplink scheduling information from the plurality of eNBs. The WCC can upload the generated collision information to the plurality of eNBs.

Upon reception of the collision information, each eNB can recognize that uplink transmission of the UE served thereby may collide with uplink transmission of another UE served by another eNB. In this case, the eNB may fail to decode a PUSCH transmitted from the corresponding UE (that is, NACK may be generated). The eNB can recognize that transmission of the PUSCH from the UE has failed due to uplink resource collision from the collision information received from the WCC and a result (i.e. NACK) of decoding of the PUSCH received from the UE.

The eNB can transmit an updated UL grant (i.e. uplink re-scheduling information) to the UE such that uplink transmission of the UE is performed in a resource different from the resource used for previous transmission. If the WCC does not report the collision information, the eNB receives the PUSCH from the UE in subframe #n+4 and then transmits NACK generated for the PUSCH to the UE in subframe #n+8 through a PHICH and thus the UE retransmits the PUSCH in the same resource as that used for previous transmission. That is, if the collision information is not provided, uplink collision between UEs may not be controlled or may be controlled after multiple collisions. However, when the collision information from the WCC is used as in the present invention, the eNB can provide an updated UL grant for allocation of a new resource for uplink transmission of the UE instead of transmitting NACK for the PUSCH, and thus uplink collision can be rapidly solved or prevented.

Information exchange between an eNB and the WCC through wired connection may not be fixed to a specific time and can be performed in a specific time range. In addition, a radio link from an eNB to a UE is separated from a wired link between the eNB and the WCC, transmission through the wired link can be performed independently irrespective of transmission through the radio link.

Specifically, the WCC can download uplink scheduling information within a time range prior to and/or following subframe n# (e.g. immediately prior to subframe #n and/or immediately after subframe #n). For example, the WCC can download uplink scheduling information immediately prior to transmission of a UL grant PDCCH from an eNB to a UE (i.e. immediately prior to subframe #n) (FIG. 15). Otherwise, the WCC can download the uplink scheduling information immediately after transmission of the UL grant PDCCH from the eNB to the UE (i.e. immediately after subframe #n) (FIG. 16). Alternatively, the WCC can download the uplink scheduling information simultaneously with transmission of the UL grant PDCCH from the eNB to the UE (not shown).

In addition, the WCC can upload collision information within a time range between subframe #n and subframe #n+8. Considering processing time necessary for an eNB to which the collision information has been uploaded to update uplink scheduling information for PUSCH retransmission, collision information upload timing of the WCC may be limited to prior to subframe #n+8−k (k being the processing time of the eNB, e.g. 4).

For example, the WCC can upload the collision information to the eNB before the corresponding UE transmits a PUSCH to the eNB (i.e. prior to subframe #n+4) (FIG. 15). Otherwise, the WCC can upload the collision information to the eNB after the corresponding UE transmits the PUSCH to the eNB (i.e. after subframe #n+4 and prior to subframe #n+8) (FIG. 16).

If the eNB receives the collision information from the WCC prior to reception of the PUSCH as shown in the example of FIG. 15, the eNB can immediately recognize that PUSCH decoding failure has been caused by uplink transmission resource collision when PUSCH decoding failure occurs (i.e. NACK is generated) and secure a time sufficient to generate the update UL grant.

In the case of the example of FIG. 16, whether or not the eNB receives the collision information from the WCC can be determined according to whether or not the eNB successfully receives the PUSCH from the UE and thus traffic burden on the wired backhaul link can be reduced. Specifically, the collision information can be fed back from the WCC to the eNB and reflected in uplink scheduling for PUSCH retransmission of the UE only when the eNB fails to decode the PUSCH transmitted from the UE (i.e. only when the eNB generates NACK for the PUSCH). When the eNB successfully decodes the PUSCH transmitted from the UE (i.e. when the eNB generates ACK for the PUSCH), the UE need not retransmit the PUSCH and thus the collision information may be not fed back from the WCC to the eNB. In this case, the eNB can inform the WCC that the collision information need not be uploaded.

Here, the collision information may be uploaded from the WCC to the eNB after the eNB receives the PUSCH as quickly as possible (e.g. immediately after subframe #n+4) in consideration of the processing time necessary for the eNB to generate the updated UL grant.

In the examples of FIGS. 15 and 16, the WCC may download the uplink scheduling information of the plurality of eNBs prior to downlink transmission of the plurality of eNBs and upload collision information generated based on the uplink scheduling information. In this case, uplink transmission collision can be prevented (there is a high possibility that collision occurs during initial transmission in the above-described example). However, when the eNBs generate the uplink scheduling information immediately before providing the same to corresponding UEs, a time necessary for the WCC to acquire the uplink scheduling information and generate the collision information may be insufficient. Accordingly, the examples of FIGS. 15 and 16 may be a solution that can be universally adopted for uplink collision avoidance using the WCC.

Figure 17:
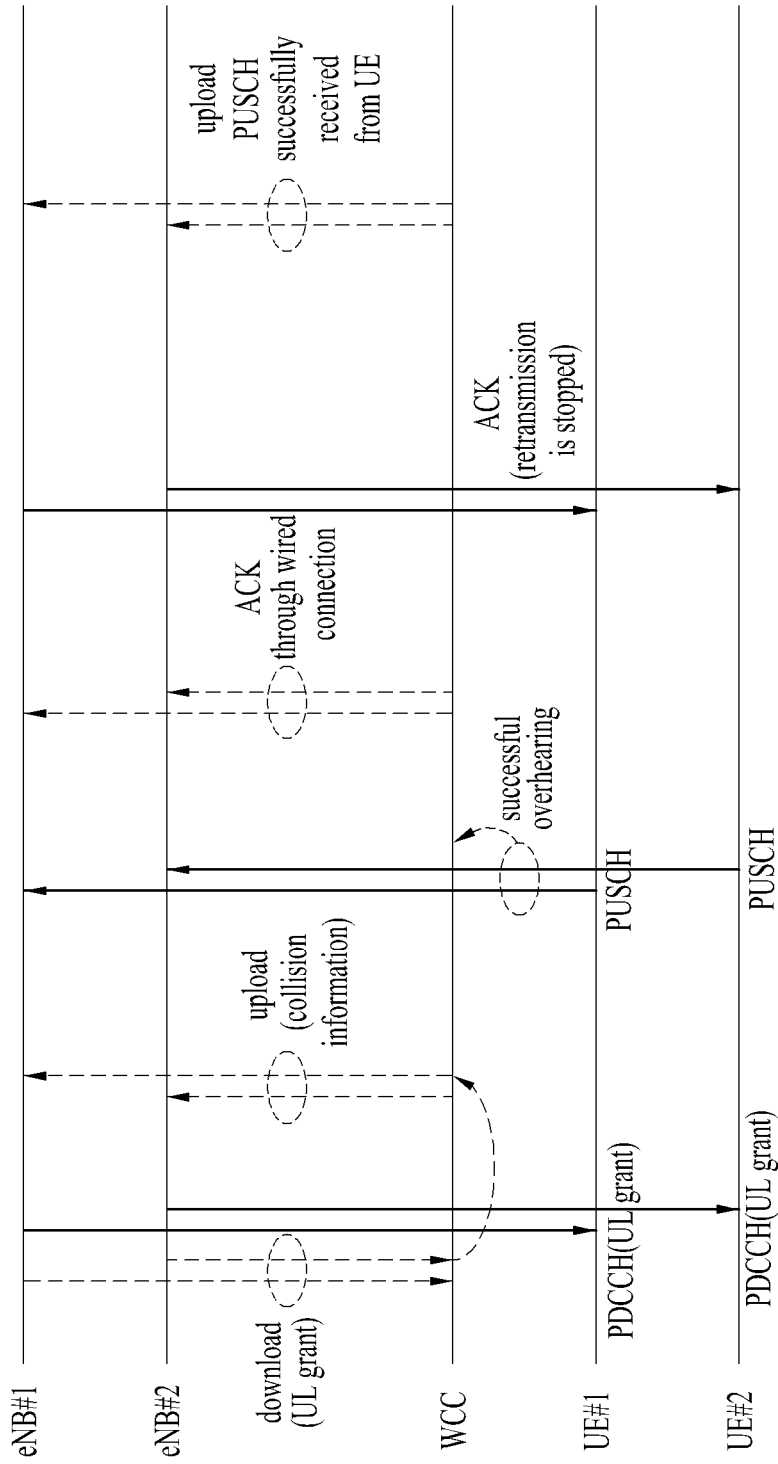
Figure 18:
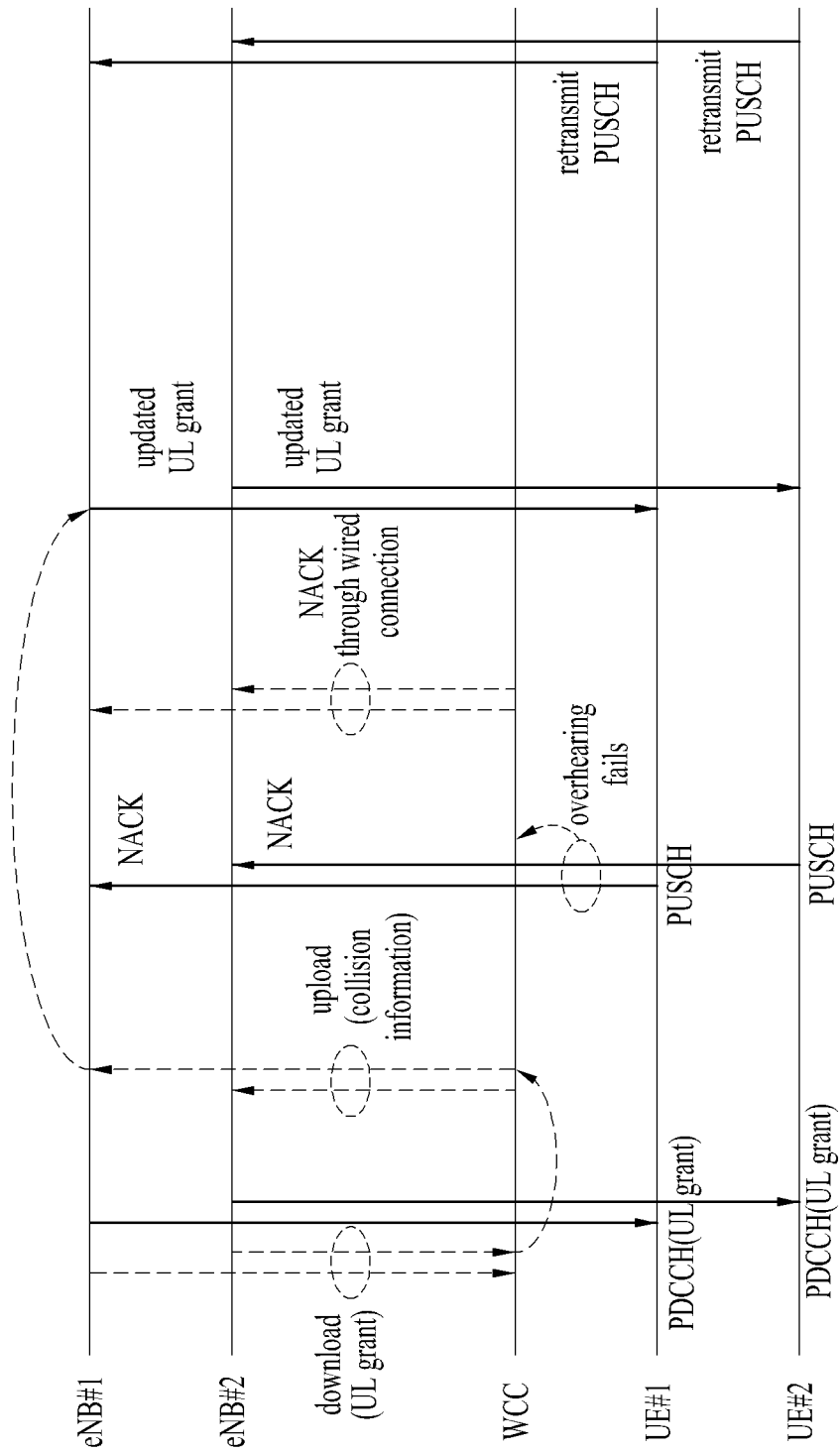

FIGS. 17 and 18 are diagrams illustrating operations of the WCC when inter-cell downlink collision occurs. The examples of FIGS. 17 and 18 assume that the WCC performs overhearing and transmits a PUSCH.

While the examples of FIGS. 17 and 18 are described based on the timing relationship of FIG. 15, the examples of FIGS. 17 and 18 can be applied to the WCC operating based on the timing relationship of FIG. 16. That is, the time at which the WCC downloads uplink scheduling information of a plurality of eNBs can be included in a time range before and after the timing of transmission of PDCCHs (UL grants) from the plurality of eNBs to UEs and the time at which the WCC uploads collision information to the plurality of eNBs can be included in a time range before and after the timing of transmission of PUSCHs from the plurality of UEs to the eNBs.

The example of FIG. 17 describes parts different from the example of FIG. 15 and description of redundant parts is omitted. In the example of FIG. 17, the WCC can overhear PUSCHs transmitted from the plurality of UEs to the plurality of eNBs through radio links. Upon successful overhearing of the PUSCHs, the WCC can upload ACK information signaling successful overhearing to the eNBs through wired connection. The ACK information uploaded by the WCC may correspond to a signal for signaling participation of the WCC in PUSCH retransmission to the eNBs. The eNBs can be aware that the WCC has correctly overheard the PUSCHs transmitted from the UEs on the basis of the collision information uploaded by the WCC and the ACK information from the WCC.

Here, when an eNB fails to decode a PUSCH transmitted from a corresponding UE, the eNB can generate ACK information for the PUSCH and transmit the ACK information to the UE in order to stop PUSCH retransmission of the UE (otherwise, the eNB can generate ACK information all the time irrespective of whether of not the eNB successfully decodes the PUSCH when the WCC uploads ACK for the PUSCH to the eNB). Alternatively, when the WCC uploads the ACK for the PUSCH to the eNB, the WCC may transmit the ACK for the PUSCH to the UE (not shown).

Consequently, the UE does not perform PUSCH retransmission because the UE has received the ACK information for the PUSCH and the WCC can upload the overheard PUSCH to each eNB. Upload of the overheard PUSCH may correspond to retransmission of the PUSCH that has not been successfully decoded from the viewpoint of the eNB.

The example of FIG. 18 describes parts different from the example of FIG. 15 and description of redundant parts is omitted. In the example of FIG. 18, the WCC may attempt to overhear the PUSCHs transmitted from the plurality of UEs through radio links. However, the WCC may fail to overhear a PUSCH transmitted from a UE even when the UE is close to the WCC because uplink transmission resource collision occurs if the UE is out of the operating range of the WCC. In this case, the WCC can upload NACK information signaling PUSCH overhearing failure (or information indicating that the WCC cannot participate in PUSCH retransmission) to each eNB through wired connection.

Each eNB can determine whether or not uplink transmission of the corresponding UE has failed due to collision on the basis of the collision information uploaded by the WCC and a PUSCH decoding result. In addition, the eNB can wait for a report of the WCC indicating whether or not the WCC has successfully overheard the PUSCH transmitted from the corresponding UE when the WCC has the PUSCH overhearing function and determine whether or not a new resource for PUSCH transmission of the UE needs to be allocated.

When the eNB receives the collision information from the WCC, fails to decode the PUSCH transmitted from the corresponding UE and is notified by the WCC that the WCC has failed to overhear the PUSCH, the eNB can transmit an updated UL grant (i.e. re-scheduling information for PUSCH transmission of the UE) to the UE. The example of FIG. 18 illustrates transmission of updated UL grants from all of the plurality of eNBs to UEs served thereby. Accordingly, the plurality of UEs can perform PUSCH retransmission using uplink resources allocated thereto (i.e. newly allocated resources, thereby avoiding collided resources).

In the examples described above with reference to FIGS. 9 to 18, a new resource other than resources determined as resources in which collision occurs is set as a resource avoiding collision, and a plurality of cells need to allocate different new resources. When the WCC has a scheduler function, the WCC may allocate different resources to cells.

The above-described embodiments of the present invention may be independently applied or two or more thereof may be simultaneously applied and a description of redundant parts is omitted for clarity.

In description of various embodiments of the present invention, an eNB is exemplified as a downlink transmitter and a UE is exemplified as a downlink receiver. However, the present invention is not limited thereto. That is, the principle of the present invention, described through various embodiments of the present invention, can be equally applied when a relay is used as a downlink transmitter transmitting signals to a UE or an uplink receiver receiving signals from the UE or when the relay is used as an uplink transmitter transmitting signals to an eNB or a downlink receiver receiving signals from the eNB.

Figure 19:
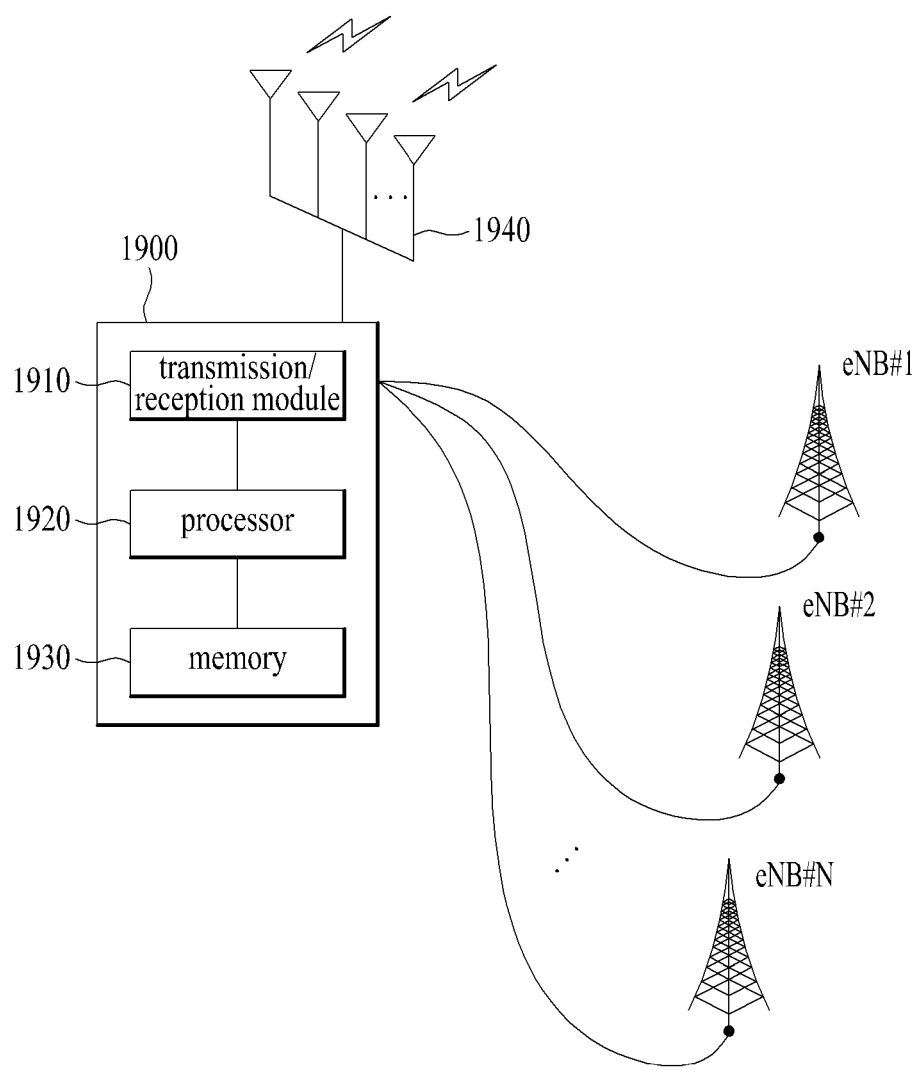
FIG. 19 illustrates a configuration of a transceiver apparatus according to the present invention.

FIG. 19 illustrates a configuration of a transceiver according to the present invention.

Referring to FIG. 19, a transceiver 1900 according to the present invention may include a transmission/reception module 1910, a processor 1920, a memory 1930 and an antenna 1940. The transmission/reception module 1910 may be configured to transmit signals, data and information to an external device and to receive signals, data and information from the external device. The processor 1920 may control the overall operation of the transceiver 1900 and may be configured to process information transmitted/received by the transceiver 1900 to/from the external device. The memory 1930 may store the processed information for a predetermined time and may be replaced by a component such as a buffer (not shown). The antenna may include a plurality of antennas and support MIMO transmission/reception.

The transceiver 1900 according to one embodiment of the present invention may be connected to first and second eNBs and configured to generate and provide collision information. The processor 1920 of the transceiver 1900 may be configured to acquire first scheduling information generated by the first eNB eNB#1 for the first UE UE#1 and second scheduling information generated by the second eNB eNB#2 for the second UE UE#2. In addition, the processor 1920 may be configured to generate collision information on the basis of the acquired first scheduling information and second scheduling information. Furthermore, the processor 1920 may be configured to transmit the collision information to the first and second eNBs. While the transceiver 1900 participates in collision control for transmission of two cells in the above-described examples, the present invention is not limited thereto and the principle of the present invention can be equally applied to inter-cell collision control in N (N≥2) cells.

Scheduling information may include one or more of downlink transmission resource allocation information and uplink transmission resource allocation information in each cell. An eNB may generate updated scheduling information based on the collision information transmitted from the transceiver 1900. Here, acquisition of the scheduling information and transmission of the collision information may be performed through a wired link between the transceiver 1900 and the eNB.

The collision information may be configured such that the scheduling information of the first eNB is delivered to the second eNB and the scheduling information of the second eNB is delivered to the first eNB. In addition, the collision information may include one or more of information indicating whether resources scheduled by the first and second eNBs collide with each other, information indicating collided resources and information indicating first and second UEs causing collision. Furthermore, the collision information may include updated first scheduling information and updated second scheduling information generated by the transceiver when resources scheduled by the first and second eNBs collide with each other.

The transceiver may acquire scheduling information within a predetermined time range including the time at which an eNB transmits the scheduling information to a UE. The transceiver may deliver the collision information within a predetermined time range including the time at which transmission (e.g. transmission of HARQ ACK/NACK information about downlink data or transmission of uplink data) from the UE to the eNB is performed according to the scheduling information.

The transceiver may overhear downlink transmission of each eNB or uplink transmission from each UE through the antenna 1940 and the transmission/reception module 1910. Whether or not overhearing has been successfully performed may be reported to each eNB. A downlink signal overheard by the transceiver 1900 may be retransmitted to the corresponding UE and an uplink signal overheard by the transceiver 1900 may be retransmitted to the corresponding eNB.

Description of the transceiver 1900 may be applied to the above-mentioned WCC, relay node or RRH device. For example, the transceiver 1900 of FIG. 19 can be linked to a plurality of eNBs eNB#1, eNB#2, . . . eNB#N in a wired manner. In addition, the transceiver 1900 may be configured to overhear signals to/from a plurality of UEs.

The configuration of the transceiver 1900 may be implemented such that the above-described embodiments can be independently applied or two or more thereof can be simultaneously applied and description of redundant parts is omitted for clarity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described embodiments of the present invention can be applied to various mobile communication systems.

The invention claimed is:

1. A method for transmitting collision information at a transceiver connected to a first eNB and a second eNB, the method comprising:
obtaining first scheduling information, generated by the first eNB, with regard to a first user equipment (UE), and second scheduling information, generated by the second eNB, with regard to a second UE;
generating the collision information based on the obtained first scheduling information and second scheduling information; and
transmitting the collision information to the first eNB and the second eNB.

2. The method according to claim 1, wherein the first scheduling information includes one or more of downlink transmission resource allocation information and uplink transmission resource allocation information about the first UE and the second scheduling information includes one or more of downlink transmission resource allocation information and uplink transmission resource allocation information about the second UE.

3. The method according to claim 1, wherein the collision information transmitted to the first eNB includes the second scheduling information and the collision information transmitted to the second eNB includes the first scheduling information.

4. The method according to claim 1, wherein the collision information includes one or more of information indicating whether or not resources scheduled by the first and second eNBs collide with each other, information indicating the resources colliding each other and information indicating the first and second UEs.

5. The method according to claim 1, wherein the collision information includes updated first scheduling information and updated scheduling information, generated by the transceiver, when resources scheduled by the first and second eNBs collide with each other.

6. The method according to claim 1, wherein the obtaining of the scheduling information is performed within a predetermined time range including one or more of a time at which the first scheduling information is transmitted to the first UE and a time at which the second scheduling information is transmitted to the second UE.

7. The method according to claim 1, wherein the transmitting of the collision information is performed within a predetermined time range including one or more of a time at which transmission from the first UE to the first eNB is performed and a time at which transmission from the second UE to the second eNB is performed.

8. The method according to claim 7, wherein transmission from the first UE or the second UE corresponds to transmission of ACK/NACK information on downlink data or uplink data transmission based on uplink scheduling information.

9. The method according to claim 1, further comprising:
overhearing one or both of a downlink signal transmitted from the first or second eNB and an uplink signal transmitted from the first or second UE; and
reporting information indicating whether or not overhearing has been successfully performed to one or both of the first and second eNBs.

10. The method according to claim 1, wherein the overheard downlink signal is retransmitted to one or both of the first and second UEs and the overheard uplink signal is retransmitted to one or both of the first and second eNBs.

11. The method according to claim 1, wherein scheduling information updated by each of the first and second eNBs is generated based on the collision information.

12. The method according to claim 1, wherein acquisition of the first scheduling information and the second scheduling information and transmission of the collision information are performed through wired connection between the transceiver and the first and second eNBs.

13. A transceiver connected to a first eNB and a second eNB, comprising:
a transmission/reception module for transmitting/receiving a signal to/from an external device; and
a processor for controlling the transceiver,
wherein the processor is configured to obtain first scheduling information, generated by the first eNB, with regard to a first UE, and second scheduling information, generated by the second eNB, with regard to a second UE, to generate collision information based on the obtained first scheduling information and second scheduling information and to transmit the collision information to the first eNB and the second eNB.

* * * * *